US010900580B2

(12) United States Patent
Butterworth

(10) Patent No.: US 10,900,580 B2
(45) Date of Patent: Jan. 26, 2021

(54) VENTED DRAINING DEVICE FOR DRAINING LIQUID SYSTEMS

(71) Applicant: TB Products, Englewood, CO (US)

(72) Inventor: Theodore Butterworth, Englewood, CO (US)

(73) Assignee: Theodore Butterworth, Englewood, CO (US)

( * ) Notice: Subject to any disclaimer, the term of this patent is extended or adjusted under 35 U.S.C. 154(b) by 102 days.

(21) Appl. No.: 16/290,129

(22) Filed: Mar. 1, 2019

(65) Prior Publication Data

US 2019/0271401 A1 Sep. 5, 2019

Related U.S. Application Data

(60) Provisional application No. 62/637,225, filed on Mar. 1, 2018.

(51) Int. Cl.
| | |
|---|---|
| *F16K 24/02* | (2006.01) |
| *F16L 55/07* | (2006.01) |
| *F16K 24/06* | (2006.01) |
| *E03D 11/13* | (2006.01) |

(52) U.S. Cl.
CPC .............. *F16K 24/02* (2013.01); *F16K 24/06* (2013.01); *F16L 55/07* (2013.01); *E03D 11/13* (2013.01)

(58) Field of Classification Search
CPC ............... B65D 39/08; B65D 2231/00; B65D 2231/02; B65D 2231/022; B65D 2205/00; B65D 51/1666; B65D 51/1672; B65D 51/1688; F16K 24/02; F16K 24/06; F16L 55/07; E03D 11/13

USPC .... 220/254.1–254.9, 255, 256.1–259.5, 303, 220/703–709; 222/211, 153.01; 215/307, 215/214

See application file for complete search history.

(56) References Cited

U.S. PATENT DOCUMENTS

| | | | |
|---|---|---|---|
| 1,240,532 A | | 9/1917 | Barrow et al. |
| 2,066,121 A | * | 12/1936 | Morris ................. B65D 77/283 215/229 |
| 3,568,870 A | | 3/1971 | Elston |
| 4,011,829 A | * | 3/1977 | Wachsmann .............. A61J 7/04 116/308 |
| 4,087,023 A | * | 5/1978 | Szczepanski ......... B05B 11/046 222/209 |
| 4,428,508 A | | 1/1984 | Gardikas et al. |
| 4,860,932 A | | 8/1989 | Nagy |
| 5,048,705 A | | 9/1991 | Grant et al. |
| 5,122,272 A | * | 6/1992 | Iana .......................... A45F 3/16 210/244 |
| 5,513,762 A | * | 5/1996 | Janani ................ A47G 19/2266 215/229 |

(Continued)

FOREIGN PATENT DOCUMENTS

GB 2443477 A 5/2008

*Primary Examiner* — Kareen K Thomas
(74) *Attorney, Agent, or Firm* — Voz Patents, LLC

(57) ABSTRACT

A vented draining device configured to be affixed to an existing container, such as a plastic beverage bottle with a threaded neck finish. The vented draining device allows for the attachment of a tube for the connection of the draining device to a fluidic system for draining while venting air from the existing container. Apertures in the draining device provide venting for the exhaust of air which is displaced by the fluid which is drained into the container.

14 Claims, 7 Drawing Sheets

(56) References Cited

U.S. PATENT DOCUMENTS

| | | | | |
|---|---|---|---|---|
| 5,638,970 | A * | 6/1997 | Garby | A61J 7/04 |
| | | | | 116/308 |
| 6,427,928 | B1 * | 8/2002 | Hirota | B65D 77/283 |
| | | | | 215/229 |
| 6,523,711 | B1 * | 2/2003 | Hughes | A47G 19/2266 |
| | | | | 215/308 |
| 7,204,382 | B2 | 4/2007 | Cezeaux | |
| 8,251,263 | B2 * | 8/2012 | DeMarco | B65D 51/18 |
| | | | | 220/253 |
| 10,117,533 | B2 * | 11/2018 | Chen | A47G 19/2272 |
| 2002/0092858 | A1 | 7/2002 | Bowman | |
| 2006/0086758 | A1 | 4/2006 | Coles | |
| 2008/0006718 | A1 * | 1/2008 | Junkel | A45F 3/16 |
| | | | | 239/333 |
| 2010/0084397 | A1 * | 4/2010 | Kubo | B65D 47/18 |
| | | | | 220/256.1 |
| 2011/0062170 | A1 * | 3/2011 | Kemper | A47G 19/2266 |
| | | | | 220/708 |
| 2014/0284298 | A1 * | 9/2014 | Epars | C02F 1/003 |
| | | | | 215/11.1 |
| 2016/0046421 | A1 * | 2/2016 | Brown | A47G 19/2227 |
| | | | | 222/545 |
| 2016/0100703 | A1 | 4/2016 | Fenner | |
| 2016/0272377 | A1 | 9/2016 | Savino | |

* cited by examiner

VENTED DRAINING DEVICE FOR DRAINING LIQUID SYSTEMS

CROSS REFERENCE TO RELATED APPLICATIONS

This application claims benefit to provisional patent application No. 62/637,225, entitled "Drain Bottle for the Draining of Plumbing to Prevent Water Spillage", filed Mar. 1, 2018, which is incorporated by reference in its entirety for all purposes.

FIELD OF THE INVENTION

The present invention is directed to a vented draining device for the fixation to a container for the drainage and containment of fluids. More specifically, the present invention relates to a device directed to seal a container, allowing the drainage of a system containing liquid in a manner to mitigate spillage.

BACKGROUND OF THE INVENTION

The maintenance and repair of plumbing systems in domestic and commercial plumbing installations commonly involves the drainage of the fluids commonly water—from a plumbing system. The draining of a plumbing system is typically performed either at a pre-installed drainage port or at a location where the pipe has been cut for maintenance. The draining of such systems often results in the spillage of water in closed interior spaces, sometimes with poor ventilation. Moisture in interior spaces is undesirable as it can lead to unwanted mold and mildew growth, resulting in unwanted odors as potentially dangerous health hazards.

Often, the location from which the system is drained is in a location where water is not easily disposed of. Ideally, a plumbing system holding water would be drained where it is in near proximity to a drain or easily ported to the exterior. However, draining a plumbing system indoors occurs near or around closed air spaces such as wall cavities, over finished floors, or near electrical fixtures. Each of these locations present an undesirable draining location that may lead to mold growth, damage to existing installations or hazardous work environments.

As such, there is an identified need to provide a solution to allow an individual to drain a plumbing system while preventing spillage.

SUMMARY OF THE INVENTION

A common practice for draining plumbing systems for maintenance and repair surrounds placing a container, such as a 5-gallon bucket, under the source to allow the liquid to drain into the bucket. This often results in spillage creating potentially hazardous work and living situations. Furthermore, the flow of the draining liquid may vary in a manner that the container is not able to capture all the liquid draining from the system, leading to spillage.

For some, it may be common practice to dispose a first end of tube within an existing bottle and attach a second end of the tube to the plumbing system. The problem with such solutions is the lack of constraint of the tube to the bottle. In the event the bottle tips over or the tube is unintentionally pulled from the opening of the bottle during the draining process, spillage of liquid in and around the draining site would result.

Some find it advantageous to place a tube through a hole in a pre-existing bottle cap, extending the tube downward into the volume of a bottle. Although this may address the concern of tipping, the drainage rate of liquid from the plumbing system relies upon the rate at which air, displaced by the liquid, can exit the bottle. If the air is not able to escape the bottle, this results in a pressure buildup. When there is a pressure buildup, this can prevent the liquid from entering the bottle due to equilibrium between the pressure within the bottle, and the pressure exerted by the draining liquid. Pressure buildup can also create potential for leakage of the fluid contained within the bottle through sealing components such as a cap and the bottle. Furthermore, the disconnection of the second end of the tube from the plumbing fixture may result in the pressure within the bottle expelling water contained within the bottle through the tube and causing spillage around the draining site. Alternatively, if a user is draining a plumbing system by pressurizing the plumbing system, a common practice in the draining of systems (e.g. sprinkler systems), this may create pressurization within the bottle which in excess of the pressure limits of the bottle. This can result in the catastrophic failure of the bottle which may injure surrounding personnel.

Certain embodiments of the present invention relate to a vented draining device which allow a user to safely drain a plumbing system into a container through a tube without risk of spillage or potentially injurious events. By using an aperture for venting, the present invention is able to accept the draining liquid of a plumbing system without pressure buildup. The aperture allows airflow which serves to allow the exhaust of air from within the container as it is displaced by liquid entering the container. In certain embodiments, it may be desired to use a plurality of apertures. It will be appreciated by those skilled in the art that an aperture for venting surrounds an aperture through body which allows the passage of air-flow. It will be further appreciated that a plurality of smaller apertures can provide venting equivalent to a singular larger aperture.

Certain embodiments comprise a vented draining device configured to affix to an existing container, such as a bottle, to allow the drainage of a plumbing system through a tube while preventing spillage and pressurization of the container. The attachment to an existing container allows for the use of the invention with containers which are commonly available. As a result, a user may dispose of or recycle the container when the container is no longer needed, and the user no longer needs to store or carry a specialized container when not in use.

It is an aspect of certain embodiments of present invention to allow a user to attach a first end of a tube to a vented draining device, allowing the connection of the second end of the tube to a plumbing system or other liquid holding apparatus or system. The connection of a tube to the vented draining device of some embodiments is performed with a barbed tube connection. In some embodiments, a first end of a tube is affixed to a vented draining device through the use of other attachment methods known to those skilled in the art.

Certain embodiments comprise a vented draining device comprising a first body comprising a hollow cylindrical form having an inner aspect, and an outer aspect. The first body is configured to attach to an existing container through the use of threaded features or other attachment feature known to those skilled in the art. The first body has a tube connector comprising a shaft with a pathway longitudinally therethrough. The pathway of certain embodiments is axially aligned with the shaft but is not restricted thereto in alternate embodiments. The tube connector is affixed to an external surface of the first body and aligned with the first aperture, resulting in the pathway extending through the tube connector, through the first aperture, and to the inner aspect of the first body. The first body further comprises a second aperture, offset from the first aperture, extending from the outer aspect to the inner aspect. When the first body is attached to a container, a first end of a tube is affixed to the tube connector, and a second end of the tube is affixed to a source identified for draining. The fluid from the source is able to drain into the container through the tube. The second aperture acts as a vent device allowing air to escape as displaced by the fluid entering the container from the source.

Certain embodiments comprise a first body and a second body. The second body comprises a hollow form having an inner aspect and an outer aspect. The second body comprises a first aperture. The inner aspect of the second body is configured to sealably assemble with the outer aspect of the first body and the first aperture of the second body is configured to allow the tube connector of the first body to extend therethrough. The second body has a mechanical stop such that the assembly of the second body with the first body results in a volume therebetween. The second body further comprises a second aperture configured to be radially offset from the second aperture of the first body. The volume between the first body and the second body acts as a buffer between the first body and the second body and mitigate splash-through of fluid when the apparatus is used in a draining process. Furthermore, the radial offset of the second aperture of the first body from the second aperture of the second body further mitigates splash-through.

In certain embodiments comprising a first body and a second body, a volume located between the first body and the second body further comprises baffles which extend between the external surface of the first body and the internal surface of the second body. The baffles define a baffle pathway through which vented air must follow to be exhausted from the container, through the second aperture of the first body, and through the second aperture of the second body. The baffle pathway results in a circuitous path through which the vented air must travel to vent from the container, which serves to further mitigate splash-through that may otherwise occur in a draining process. It will be appreciated that embodiments having certain baffle configurations are discussed herein, however a baffle can comprise many variations as appreciated by those skilled in the art while keeping with the spirit and scope of the present invention.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the claims provided herein.

BRIEF DESCRIPTION OF THE DRAWINGS

FIG. 1B—A side view of certain embodiments of a vented draining device.
FIG. 6B—A perspective exploded view of certain embodiments of a vented draining device.
FIG. 6C—A cross-sectional exploded view of certain embodiments of a vented draining device.

DETAILED DESCRIPTION OF VARIOUS EMBODIMENTS

Figure 1A:
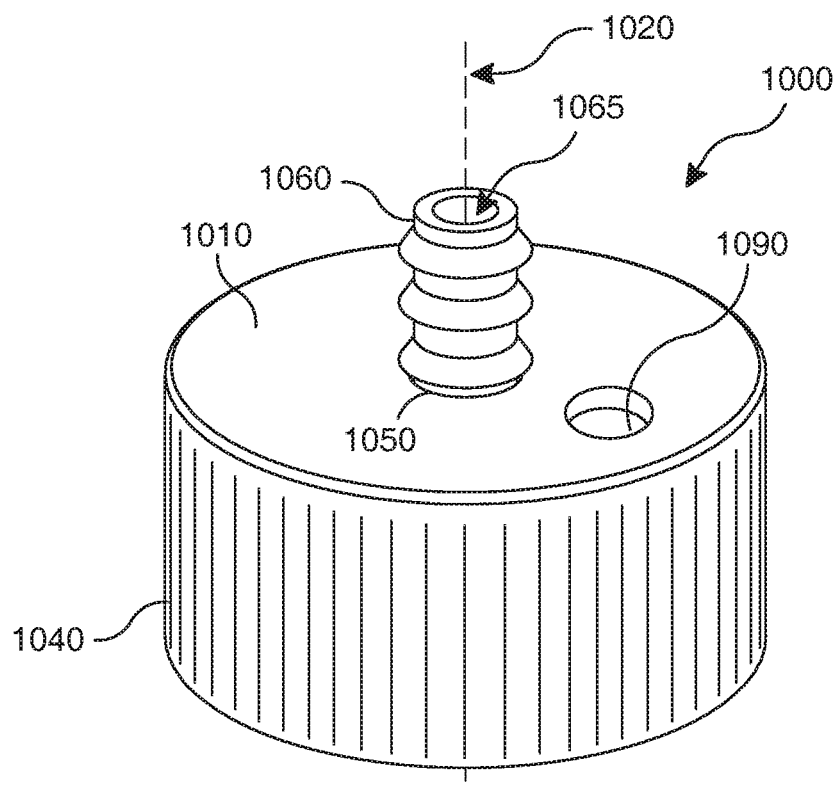
FIG. 1A—A perspective view of certain embodiments of a vented draining device.
Figure 1B:
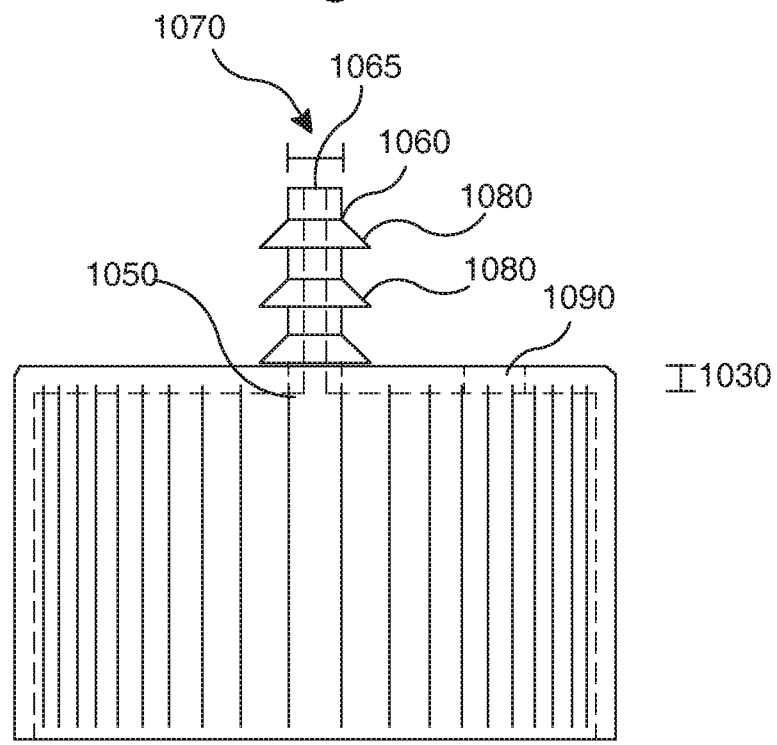

Certain embodiments of the present invention, shown in FIG. 1A-FIG. 1B, comprise a device 1000 having first body 1010 having central axis 1020 and a thickness 1030, with a sidewall 1040 extending substantially orthogonally away from the first body 1010, creating a hollow form. The first body 1010, typically has a substantially circular planar profile, but is not limited thereto. In certain embodiments, an internal surface (not shown) of the sidewall comprises fixation elements 3055 (not shown). Fixation elements allow for the fixation of the device 1000 to an existing container. Such fixation elements include, but are not limited to, threading, pawls, annular ridges or other fixation means known to those skilled in the art.

Certain embodiments, shown in FIG. 1A-FIG. 1B, comprise a first aperture 1050 through the thickness 1030 of a first body. Typically aligned with a central axis 1020 of the second body, a tube connector 1060 is affixed in alignment with the first aperture 1050 of the first body. The tube connector 1060 has a pathway 1065 longitudinally therethrough. The tube connector 1060 is configured to allow the attachment of a tube to the tube connector by sliding an inner diameter of the tube (not shown) over the outer diameter 1070 of the tube connector. In certain embodiments, the tube connector comprises a barb 1080 for the retention of the tube to the tube connector 1060. Certain embodiments further comprise a second aperture 1090 through an external surface 1015 of the first body, offset from the first aperture 1050. In certain embodiments, it may be desired for a first body 1010 to comprise a third aperture 1090 (not shown), also offset from the central axis 1020. It will be appreciated that additional apertures may be included as desired to increase venting capability.

Figure 2:
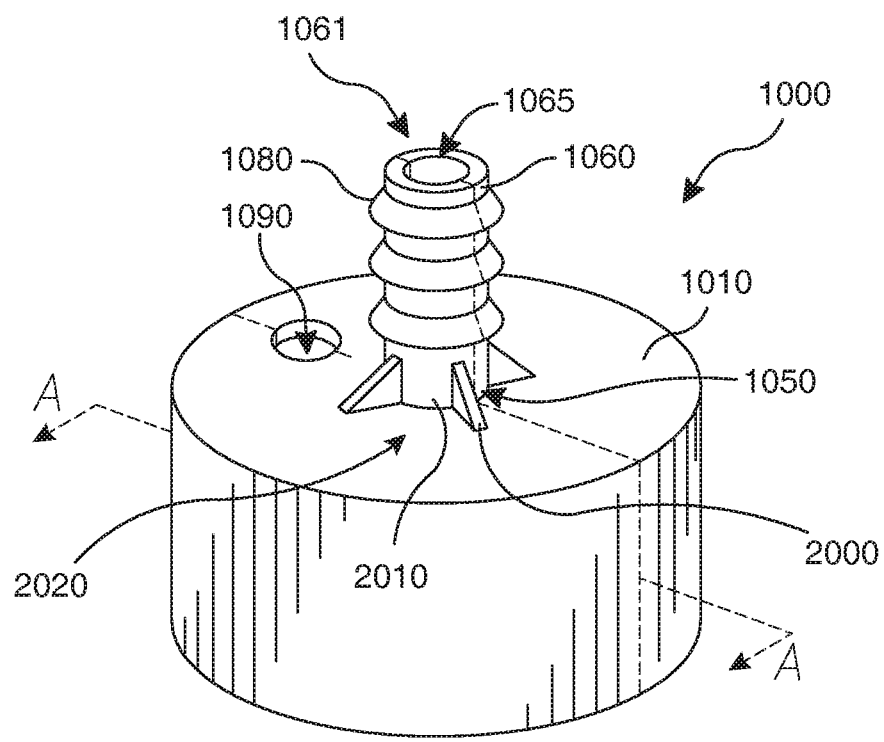
FIG. 2—A perspective view of certain embodiments of a vented draining device.

In certain embodiments, shown in FIG. 2, a device 1000 comprising a first body 1010 having a first aperture 1050, a second aperture 1090, and a tube connector 1060—further comprises a stiffener 2000. The stiffener 2000, attached to an external surface 2010 of the tube connector extends radially outward and is affixed to a top surface 2020 of the first body. It will be appreciated that although a stiffener 2000 may comprise any shape or form, it is desired that a stiffener 2000 of certain embodiments comprises a thin-wall rib structure having a triangular profile. A first leg of the triangular profile of the stiffener 2000 is affixed to the external surface 2010 of the tube connector, and a second leg is affixed to the top surface 2020 of the first body 1010.

Figure 3:
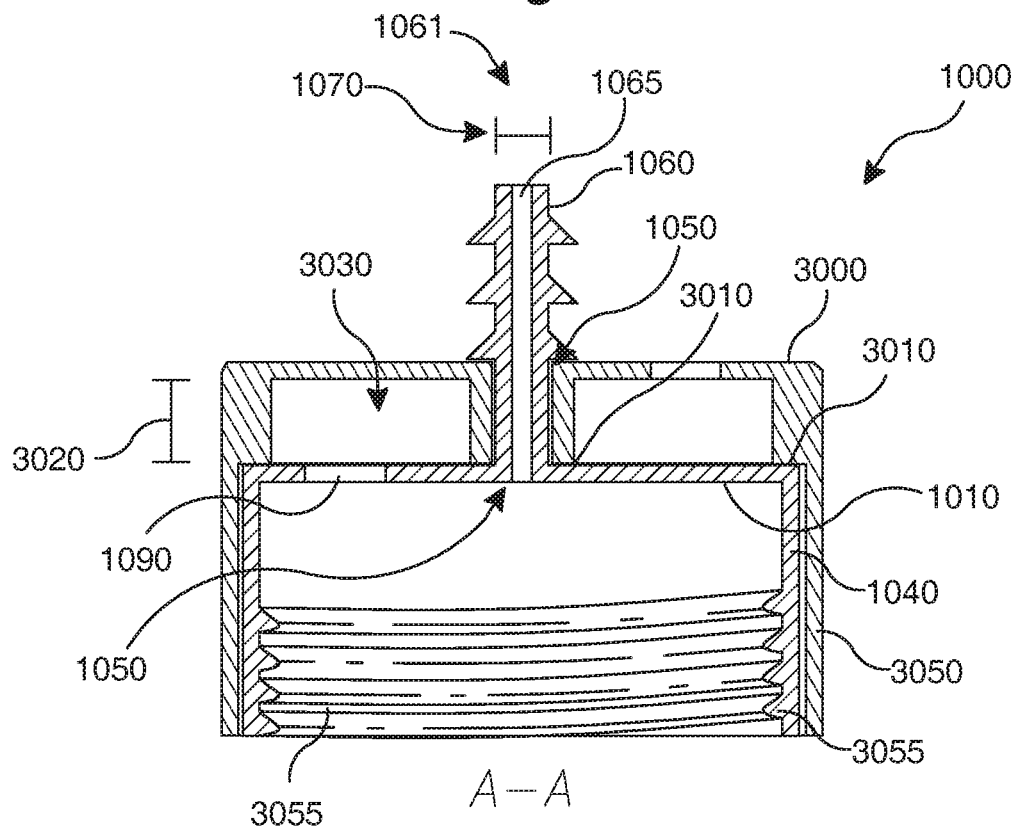
FIG. 3—A cross-sectional side view of certain embodiments of a vented draining device.

In certain embodiments, shown in FIG. 3, a device 1000 comprises a first body 1010 and a second body 3000, and mechanical stops 3010 disposed between the first body 1010 and the second body 3000. The mechanical stops 3010 provide an offset 3020, thereby creating an airgap 3030 between the first body 1010 and the second body 3000. The first body further comprises a first aperture 1050. A first aperture 3040 of the second body, and the first aperture 1050 of the first body are aligned to allow a tube connector 1060 disposed between the first body 1010 and the second body 3000 to connect between the first aperture 1050 of the first body with the first aperture 3040 of the second body.

In certain embodiments, shown in FIG. 3, a first body 1010 comprises a sidewall 1040 extending in a first direction from the first body 1010, and a second body 3000. The second body 3000 comprises a larger profile than that of the first body 1010 in a substantially similar shape. The first body 1010 is configured to nest within the sidewall 3050 of the second body when assembled. In certain embodiments, the first body 1010 further comprises a sidewall 1040 extending in the first direction from the first body 1010. The first body 1010 and the second body 3000 are configured to assemble such that the sidewall 3050 of the first body is configured to nest within the sidewall 1040 of the second body. The assembly of the first body 1010 and the second body 3000 results in an embodiment of a vented device 1000.

In certain embodiments, the sidewall 1040 of the first body, further comprises fixation elements 3055 which extend radially inward from the sidewall 1040 of the first body toward the central axis 1020 (FIG. 1A). The fixation elements 3055 of certain embodiments comprise threading configured to threadably engage with the threading of an existing container, such as a plastic bottle. It will be appreciated that the fixation elements 3055 can be configured to engage with threading of an existing container through a snap-fit or press-fit fixation, or through other methods of fixation known to those skilled in the art, while in keeping with the spirit and scope of the present invention.

In certain embodiments, a mechanical stop 3010 is used to provide an offset 3020 between the first body 1010 and the second body 3000. A mechanical stop 3010, as shown in FIG. 3 comprises an annular ridge attached to the sidewall 3050 of the second body which extends inward from the sidewall 3050 to interface with the first body 1010. In certain embodiments, a mechanical stop 3010 is adjacent with the outer diameter 1070 of a tube connector. It will be appreciated by those skilled in the art that mechanical stop 3010 is not limited to an annular ridge. A mechanical stop of certain embodiments may comprise blocks, a segmented annular ridge, bushings, washers, or other elements configured to provide offset 3020 between the first body 1010 and second body 3000 while keeping with the scope and spirit of the present invention.

Figure 4:
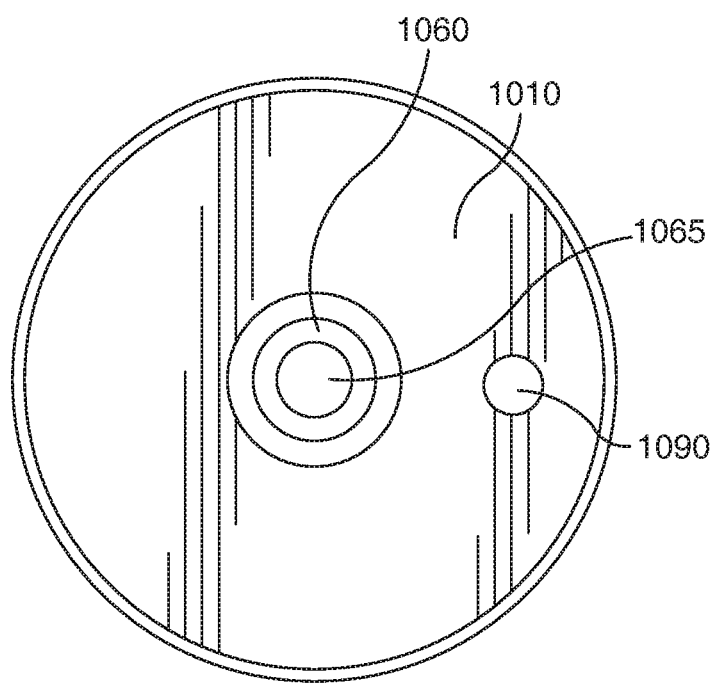
FIG. 4—A top view of certain embodiments of a vented draining device.
Figure 5:
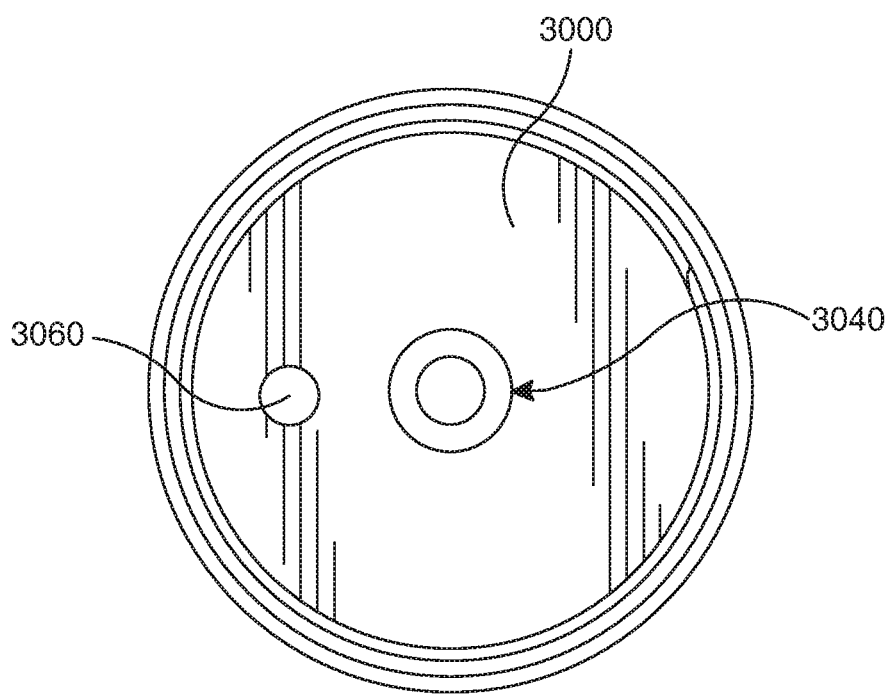
FIG. 5—A bottom view of certain embodiments of a vented draining device.

In certain embodiments, shown in FIG. 3-FIG. 5, comprising a device 1000 having a first body 1010 and a second body 3000, the first body 1010 and second body 3000 each comprise a first aperture (1050, 3040) configured to align with each other. Having an offset 3020 between the first body 1010 and the second body 3000, results in an airgap 3030 disposed between the first body 1010 and the second body 3000. The device 1000 further comprises a tube connector 1060 which extends from the first aperture 1050 of the first body through the first aperture 3040 of the first body. When the device 1000 is affixed to a container, the tube connector 1060 has an axial pathway 1065 therethrough for fluid communication between the container and the distal end 1061 of the tube connector. In such embodiments, the tube connector 1060 does not allow fluid communication between the container and the airgap 3030, or between the distal end 1061 of the tube connector and the airgap 3030.

In certain embodiments, shown in FIG. 3-FIG. 5, comprising a device 1000 having a first body 1010 and a second body 3000, the first body 1010 further comprises a second aperture 1090 offset from the first aperture 1050 of the first body. The second body 3000 further comprises a second aperture 3060 offset from the first aperture 3040 of the second body. Although the second aperture 1090 of the first body, and the second aperture 3060 of the second body may be aligned, it is preferred that they be offset from each other. In certain embodiments, the second aperture 1090 of the first body is radially offset from the second aperture 3060 of the second body. In certain embodiments, shown in FIG. 4 and FIG. 5, the second aperture 1090 of the first body and the second aperture 3060 of the second body are offset by 180 degrees.

Figure 6A:
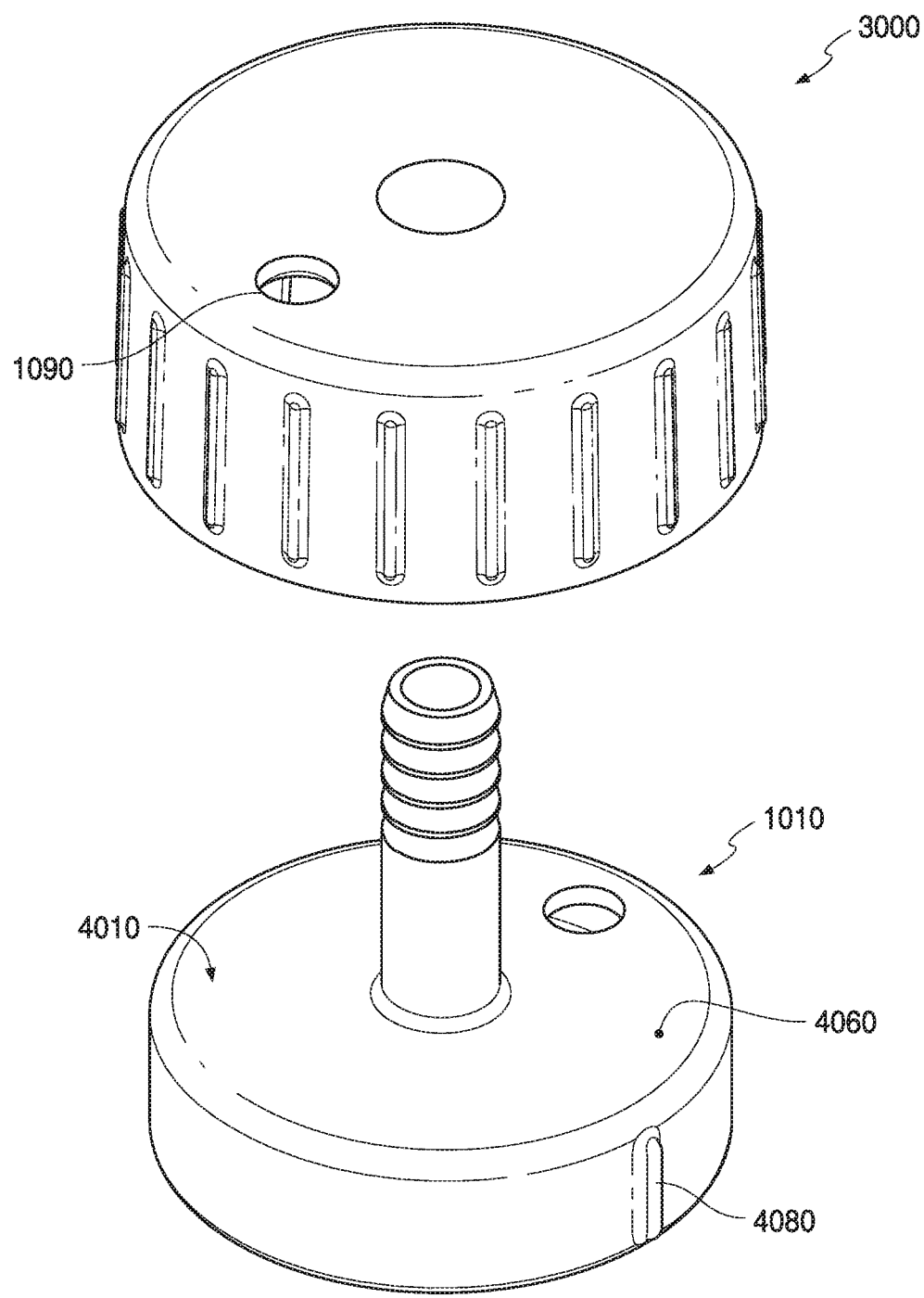
FIG. 6A—A perspective exploded view of certain embodiments of a vented draining device.
Figure 6B:
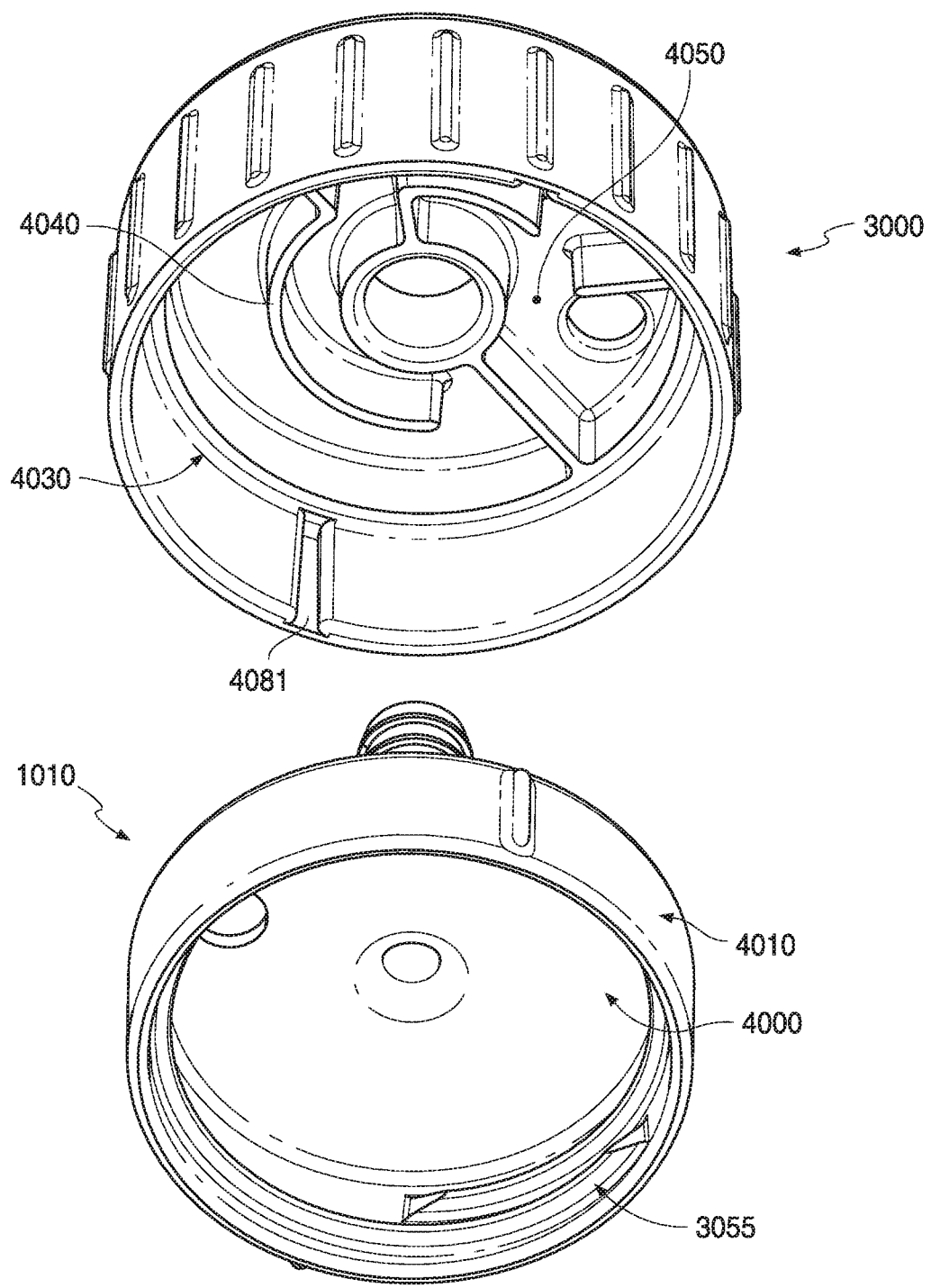

Certain embodiments, shown in FIG. 6A-FIG. 6B, comprise a first body 1010 having a hollow form with an inner aspect 4000 and an outer aspect 4010. The inner aspect 4000 of the first body 1010 comprises fixation elements 3055 configured to affix to an existing container such as a beverage bottle. In certain embodiments, the fixation elements 3055 comprise threading such as a 1.5 thread turn, otherwise referred to as a 410, neck finish according to Glass Packaging Institute (GPI) and the Society of the Plastics Industry (SPI). It will be appreciated that embodiments comprising threads known to those skilled in the art, including SPI/GPI designations of 400, 410, 415, 425, 2030, and 2035, are within the spirit and scope of the present invention. In such embodiments, it will be appreciated that the diameter of the inner aspect is configured to mate with existing bottles such as an existing 20 oz., 2 Liter, or 3 Liter Polyethylene terephthalate (PET) beverage bottle. In certain embodiments the threads of the inner aspect of the first body are given a designation such as a 28-400, wherein the "28" refers to the diameter of the neck of the container in millimeters, and the "400" refers to the neck finish or type of threads.

Figure 6C:
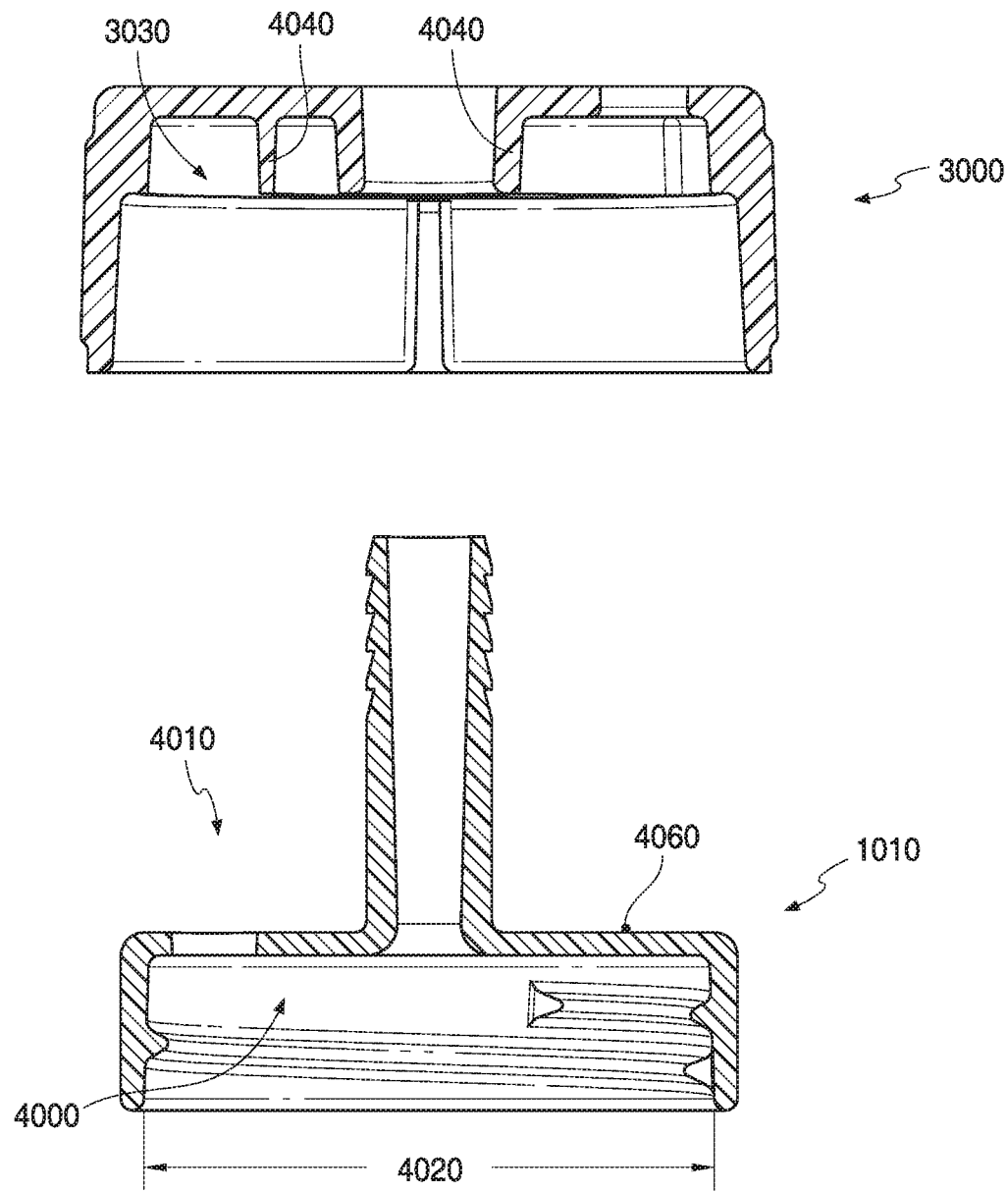

Certain embodiments, shown in FIG. 6A-FIG. 6C, comprise a vented draining device 1000 having a first body and a second body 3000. The second body 3000 has an inner aspect 4030 configured to be attached to the first body 1010 creating an airgap 3030 therebetween. The inner aspect 4000 of the first body comprises a cylindrical form with threaded features 3055, or other attachment features known to those skilled in the art. The inner aspect 4000 of the first body is configured to attach to an existing container through the use of the threaded features.

Certain embodiments, shown in FIG. 6A-FIG. 6C, comprising a first body 1010 further comprise a second body 3000. The second body 3000 comprises an inner aspect 4030 configured to sealably mate with an outer aspect 4000 of the first body. The sealable mating of the second body 3000 to the first body 1010 results in a water-tight and air-tight seal.

In certain embodiments the mating of the second body 3000 to the first body 1010 is utilizes adhesive.

Figure 7:
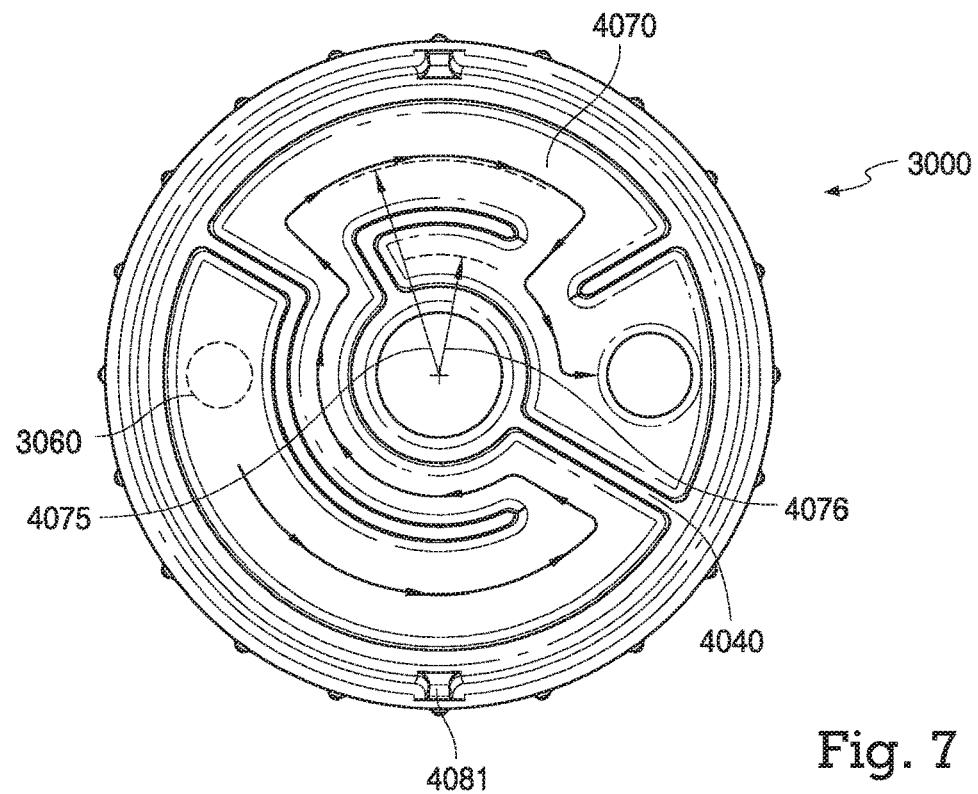
FIG. 7—A bottom view of a second body in certain embodiments of a vented draining device
FIG. 8—A bottom view of first body assembled with a second body in certain embodiments of a vented draining device.
Figure 8:
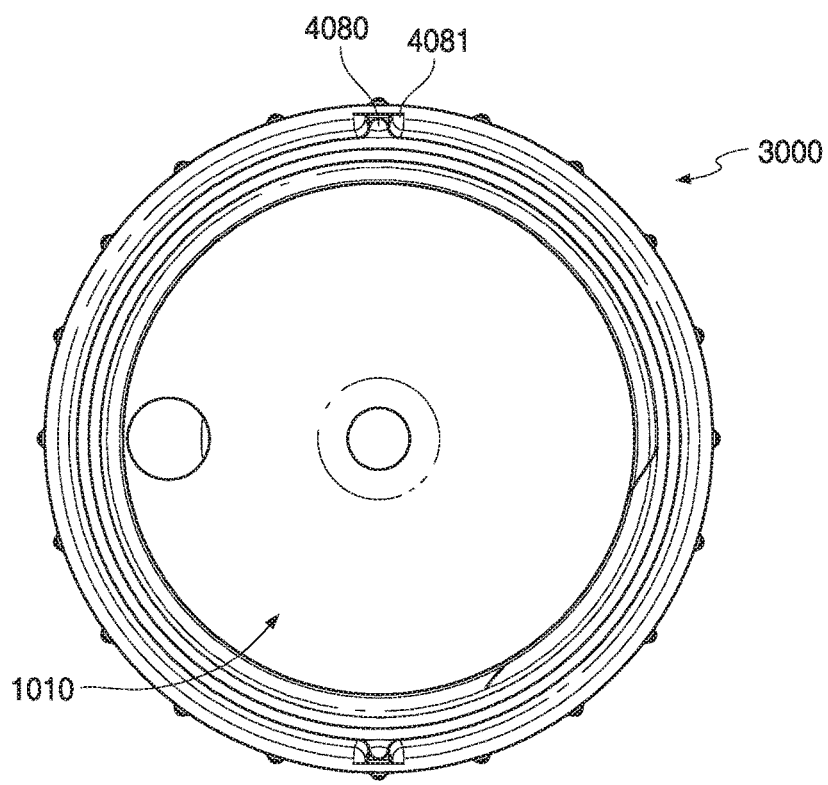

The second body 3000 of certain embodiments, shown in FIG. 6B-FIG. 7, comprises baffles 4040 affixed to an inner surface 4050 of the second body wherein the baffles 4040 extend away from the inner surface 4050. The baffles 4040 are configured to contact an external surface 4010 of the first body when second body 3000 and the first body 1010 are mated. In certain embodiments, the interface of the baffles 4040 between the first body 1010 and the second body 3000 results in a circuitous path 4070 along which venting air must travel to traverse from the second aperture 3060 of the first body through the second aperture 1090 of the second body.

In certain embodiments, FIG. 6B-FIG. 7, the second body 3000 comprises baffles 4040 configured to result in a path which venting air 4070 must follow. The path begins at an outer radius 4075, traverses to an inner radius 4076, then traverses again to the outer radius 4075, traverses once again to the inner radius 4076, and traverses to the outer radius 4075 prior to venting through the second aperture 1090 of the second body.

Certain embodiments, FIG. 6B-FIG. 8, comprise a first body 1010 having a key 4080, and a second body 3000 having a channel 4081. The key 4080 of the first body are configured to mate with the channel 4081 of the second body to assist in the rotational alignment of the first body 1010 in relation to the second body 3000. The key 4080 of the first body comprise a protuberance with an elongated profile. The channel 4081 of the second body comprise a groove which the key is configured to engage with. Certain embodiments comprise a single key and a single channel, while alternate embodiments comprise multiple keys and multiple channels. It will be appreciated by those skilled in the art that embodiments wherein the first body comprises a channel and the second body comprises a key, are in keeping with the spirit and scope of the present invention.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A vented draining device comprising:
    a first body having a hollow form comprising an inner aspect and an outer aspect;
    the inner aspect comprising a cylindrical form comprising threads;
    a first aperture through a top surface of the first body extending from the outer aspect to the inner aspect;
    a tube connector comprising a shaft, and the shaft having a pathway longitudinally therethrough extending from a first end of the tube connector to a second end of the tube connector;
    the first end of the tube connector affixed to the top surface of the first body with the pathway aligned with the first aperture;
    a hollow form comprising an inner aspect and an outer aspect;
    the inner aspect of a second body configured to sealably assemble with the outer aspect of the first body;
    a first aperture through a top surface of the second body configured to receive the tube connector therethrough; and
    a second aperture through the top surface of the second body offset from the first aperture of the second body; and
    a second aperture through the top surface of the first body offset from the first aperture;
    wherein the threads are configured to affix to a threaded opening of an existing container.

2. The vented draining device of claim 1, wherein the tube connector further comprises barbs.

3. The vented draining device of claim 1 wherein, the second body further comprises a mechanical stop configured to limit the insertion of the first body into the second body resulting in an offset between the top surface of the first body and a bottom surface of the second body when the second body is assembled with the first body.

4. The vented draining device of claim 3 wherein, the mechanical stop comprises an annular ridge consistent with the sidewall of the inner aspect of the second body.

5. The vented draining device of claim 4, wherein the second body further comprises a baffle;
    the baffle of the second body affixed to a bottom surface and extending away from the bottom surface of the second body.

6. The vented draining device of claim 5, wherein the baffles are configured to contact the top surface of the first body when the second body is assembled with the first body.

7. The vented draining device of claim 6, further comprising a plurality of baffles.

8. The vented draining device of claim 1, wherein the second body further comprises a baffle;
    the baffle of the second body affixed to a bottom surface and extending away from the bottom surface of the second body.

9. The vented draining device of claim 8, wherein the baffles are configured to contact the top surface of the first body when the second body is assembled with the first body.

10. The vented draining device of claim 9, further comprising a plurality of baffles.

11. The vented draining device of claim 1, wherein the second aperture of the first body and the second aperture of the second body are radially offset.

12. The vented draining device of claim 11, wherein the second aperture of the first body and the second aperture of the second body are radially offset by 180 degrees.

13. The vented draining device of claim 1, wherein the first body comprises a key comprising protuberance on an external surface of the first body; and
    the second body comprises a channel on an internal surface of the second body, wherein the key of the first body is configured to slidably mate with the channel of the first body.

14. A vented draining device comprising:
    a first body having a hollow form comprising an inner aspect and an outer aspect;
    the inner aspect comprising a cylindrical form comprising threads;
    a first aperture through a top surface of the first body extending from the outer aspect to the inner aspect;
    a tube connector comprising a shaft, barbs on an external surface of the tube connector, and the shaft having a pathway longitudinally therethrough extending from a first end of the tube connector to a second end of the tube connector;

the first end of the tube connector affixed to the top surface of the first body with the pathway aligned with the first aperture;

a second aperture through the top surface of the first body offset from the first aperture;

wherein the threads are configured to affix to a threaded opening of an existing container;

a second body having a hollow form comprising an inner aspect and an outer aspect;

the inner aspect of the second body configured to sealably assemble with the outer aspect of the first body;

a first aperture through a top surface of the second body having a diameter configured to receive the tube connector therethrough;

a second aperture through the top surface of the second body offset from the first aperture of the second body;

the second body further comprises a mechanical stop comprising an annular ridge consistent with the sidewall of the inner aspect of the second body;

a plurality of baffles affixed to a bottom surface of the second body, extending away from the bottom surface of the second body, wherein the baffles are configured to contact the top surface of the first body when the second body is assembled with the first body;

a key comprising a protuberance on an external surface of the first body configured to align and slidably mate with a channel in an internal surface of the second body, wherein the alignment interface of the key and channel when the second body is assembled with the first body results in the second aperture of the first body and the second aperture of the second body being radially opposed by 180 degrees.

* * * * *